Oct. 7, 1941.  J. R. MAXWELL  2,258,210
CHOCOLATE SERVING URN
Filed Jan. 4, 1941

Inventor
J. R. Maxwell
By Mason Fenwick & Lawrence
Attorneys

Patented Oct. 7, 1941

2,258,210

UNITED STATES PATENT OFFICE 2,258,210

CHOCOLATE SERVING URN

Joseph R. Maxwell, Philadelphia, Pa., assignor to Stephen F. Whitman & Son, Inc., Philadelphia, Pa.

Application January 4, 1941, Serial No. 373,172

3 Claims. (Cl. 219—43)

This device relates to cooking dispensers and more particularly to a device for use in connection with soda fountains for preparing and maintaining at a suitable temperature hot chocolate, ready to be drawn and served as desired.

Devices of this general character for the handling of coffee are in common use but the preparation and maintenance of hot chocolate has presented problems not found in connection with coffee or other beverages. If the temperature of the chocolate mix is raised to about 170° F. an undesirable skin is formed and it is, therefore, necessary that the temperature of the mix be carefully controlled, both during the preparation and as long as the mix is kept available for use, and the practical temperature range has been found to extend from 169° to 176°.

The object of the present invention is to provide a device of the character indicated of the improved and simplified form with efficient controls, manual and automatic, for maintaining the mix within the safe temperature range.

The invention consists in the novel construction, arrangement, and combination of parts hereinafter more particularly described and claimed.

One sheet of drawings accompanies this specification as part thereof, in which like reference characters indicate like parts throughout.

Figure 1:
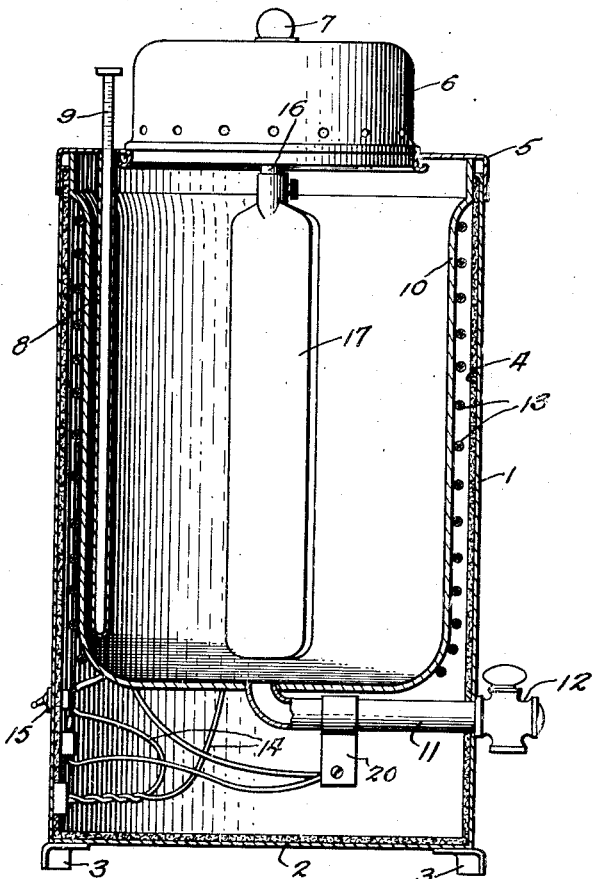
Figure 1 is a vertical cross-section through the improved device, the top being shown in elevation.

Referring to the drawing the device comprises an outer cylindrical container 1 having a bottom 2 and preferably supported on legs 3. This outer container is lined throughout with a heat insulating layer 4.

An annular closure 5 seats on the top of container 1 and supports a central closure 6 constructed as a housing having an electrical motor (not shown). This closure is provided with a handle 7 by means of which it can be removed as desired. The annular closure 5 also supports a tubular member 8 having its bottom closed and within which is positioned a thermometer 9, the calibrated portion of which extends above the closure.

A liquid container 10 is also supported by the annular closure 5 and depends within the container 1 with an air space between their side walls and respective bottoms. A pipe 11 extends from the bottom of the liquid container 10 through the side wall of container 1 and is provided on its outer end with a spigot 12. The liquid container 10 is surrounded by a heating coil 13 which is connected by suitable wires 14 with a thermostatic switch 20 and a manually controlled switch 15. The manually controlled switch 15 controls the circuit (not shown) which extends to the motor in the closure housing 6. That motor is arranged with its shaft 16 vertical and is adapted to carry on its lower end the paddle 17.

Figure 2:
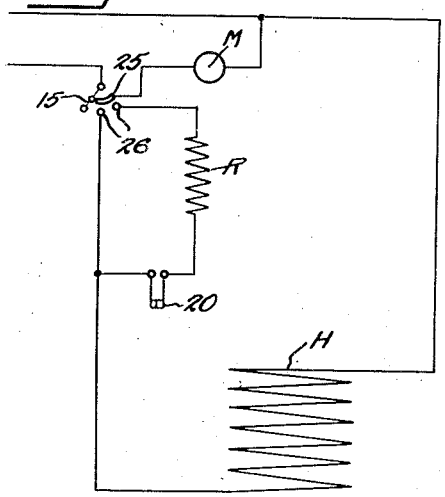
Figure 2 is a diagrammatic showing of an electrical circuit.
Figure 3:
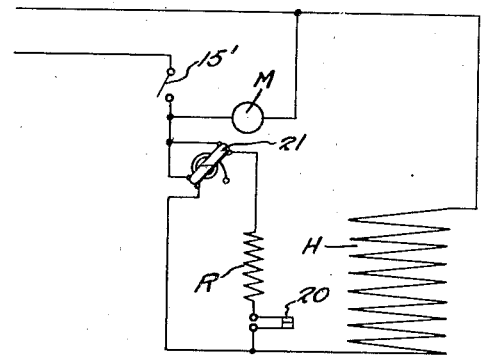
Figure 3 is a diagrammatic showing of an alternative electric circuit.

Referring to the electrical circuit illustrated in Figure 2 it will be noted that the switch 15 controls contact 25 associated with two contacts 26 so arranged that contact 25 connected with the motor circuit is completed when the circuit is made through either of the contacts 26. One of these contacts 26 leads directly to the heating coil H, while the other contact 26 is associated with a shunt circuit, which includes a resistance element R, and a thermostatic switch 20. In operation where the device is equipped with this circuit the chocolate mix having been placed in the container 10 switch 15 is thrown to the left-hand contact 26 thus closing the motor circuit and starting the paddle 17 revolving while at the same time the circuit is completed directly through the heating element H. The operator will then observe the thermometer 9 and as soon as the temperature arises to approximately 172° will throw the switch 15 to the right hand contact 26, thus breaking the direct circuit to the heating element, but continuing the closed circuit with the motor and directing the current to the heating element through the resistance R and the thermostatic switch 20, the latter being adjusted to maintain the circuit closed throughout a temperature range of 169°–176°.

Where the device is provided with a circuit as illustrated in Figure 3 the switch 15' is a simple one contact manual switch which, when closed, completes the motor circuit and directs the current into two branches of a loop circuit leading to the heating element. These branches are bridged by a duplicate thermostatic switch 21, preferably of the mercury type and adjusted to operate at relatively widely spaced temperature ranges to selectively close and open the two sides of this loop circuit, one of which at the left is directed to the heater element while that on the right includes the resistance element R and the more delicately adjusted thermostatic switch 20. With this arrangement the switch 21 at normal temperatures closes the left hand side of the loop and the switch 15' being closed the motor would start and the current would pass directly to the heater element. When the temperature rose to approximately 172° the switch 21 would break the direct side of the loop and close the right hand side of the loop thus throwing into circuit resistance R and the other thermostatic switch 20, which latter would operate continuously as in the circuit, as illustrated in Figure 2, to maintain the heat between the containers and in the inner container between the temperature range of 169°–176°.

Various modifications will readily suggest themselves to those skilled in the art but all within the scope of the present invention as claimed.

Having thus fully described my invention, I claim:

1. A chocolate cooker comprising a heat insulated container, a liquid container suspended therein, a conduit extending from the bottom of the liquid container to the exterior of the insulated container with closure means on its outer end, a closure for the space between the containers, a closure for the liquid container comprising a housing for a motor, a motor operated paddle suspended from said closure, a heating coil surrounding the liquid container, in the space between the containers and electrical circuit means including the paddle motor and heating coil, a switch and thermostatic control means as specified.

2. The device of claim 1 in which the electrical circuit includes a resistance controlled by a thermostat in the space between the containers and the switch is constructed to direct current to the heater selectively either directly or through said thermostat with the motor circuit closed in either of the operating positions of said switch.

3. The device of claim 1 in which the electrical circuit includes a manual switch, two thermostatic switches and a resistance, one of said thermostatic switches adjusted to a wide temperature range and operative to alternately open and close branch circuits one of which leads to the heating coil directly while the other leads to said coil through the resistance and said second thermostatic switch which latter is adjusted to a narrow temperature range.

JOSEPH R. MAXWELL.